United States Patent
Sherikar

(10) Patent No.: US 7,031,851 B2
(45) Date of Patent: Apr. 18, 2006

(54) METHOD OF DETERMINING VALVE LEAKAGE BASED ON UPSTREAM AND DOWNSTREAM TEMPERATURE MEASUREMENTS

(75) Inventor: Sanjay V. Sherikar, Mission Viejo, CA (US)

(73) Assignee: IMI Vision, Warwickshire (GB)

( * ) Notice: Subject to any disclaimer, the term of this patent is extended or adjusted under 35 U.S.C. 154(b) by 12 days.

(21) Appl. No.: 10/831,427

(22) Filed: Apr. 23, 2004

(65) Prior Publication Data

US 2004/0225458 A1 Nov. 11, 2004

Related U.S. Application Data

(60) Provisional application No. 60/465,309, filed on Apr. 25, 2003.

(51) Int. Cl.
*G01F 17/00* (2006.01)
*G01F 23/00* (2006.01)

(52) U.S. Cl. .............................. 702/51
(58) Field of Classification Search ................ 702/45, 702/50, 51; 137/15.11; 374/4, 5; 73/40, 73/40.5 R, 592, 49.1; 376/250, 251
See application file for complete search history.

(56) References Cited

U.S. PATENT DOCUMENTS

| | | | | | |
|---|---|---|---|---|---|
| 4,308,746 A | * | 1/1982 | Covington | ................ | 73/40.5 R |
| 4,336,708 A | * | 6/1982 | Hobgood et al. | ............... | 374/5 |
| 5,067,094 A | * | 11/1991 | Hayes | ........................ | 702/51 |
| 2002/0116986 A1 | * | 8/2002 | Pompa et al. | ................ | 73/49.1 |

* cited by examiner

*Primary Examiner*—Bryan Bui
*Assistant Examiner*—Demetrius Pretlow
(74) *Attorney, Agent, or Firm*—Stetina Brunda Garred & Brucker

(57) ABSTRACT

Disclosed is a method for measuring leakage flow rate of a valve wherein fluid flows through the valve in a single-phase flow of a gas or steam. The underlying principle upon which the leakage flow rate may be determined is that the heat loss across a length of bare pipe located downstream of the valve causes a decrease in the temperature of the leakage flow. Also disclosed is a method for measuring the leakage flow rate when the fluid passing through the valve transitions from a liquid-phase flow into a two-phase flow of liquid and steam. In two-phase flow, the underlying principle upon which the leakage flow rate may be determined is that any leakage of the valve will cause an increase in the pressure on the downstream side of the valve because of frictional resistance to flow in the downstream piping which corresponds to an increase in temperature thereof.

13 Claims, 5 Drawing Sheets

METHOD OF DETERMINING VALVE LEAKAGE BASED ON UPSTREAM AND DOWNSTREAM TEMPERATURE MEASUREMENTS

CROSS-REFERENCE TO RELATED APPLICATIONS

This application claims priority to U.S. Provisional Application No. 60/465,309, filed Apr. 25, 2003.

STATEMENT RE: FEDERALLY SPONSORED RESEARCH/DEVELOPMENT (Not Applicable)

BACKGROUND OF THE INVENTION

Control valves play a major role in the operating efficiency of power generating systems. Such control valves must be capable of regulating the flow of fluid under extreme thermodynamic conditions. High-temperature fluid flowing through the control valve may be under high pressure and may be flowing at a high velocity. Control valves must be capable of regulating the flow of single-phase fluid where the fluid is in a gaseous state. Control valves must also be capable of regulating the flow of two-phase fluid wherein a liquid phase of the fluid at the valve inlet flashes into a mixture of liquid and steam at the valve outlet. Regardless of the form of the fluid passing through the control valve, tight shutoff of the control valve must be maintained in order to minimize valve leakage such that operating costs and maintenance intervals of the power generating system may be kept to a minimum.

Valve leakage may be caused by a significant pressure gradient across the valve seat of the control valve which can lead to cavitation. Cavitation results in the formation of vapor bubbles in the liquid flow which can cause pitting of the valve seat as well as damage downstream components. The pitting of the valve seat may result in leak paths that may increase in size over time due to erosion. Erosion may also occur as a result of fluid flowing past the valve seat of the control valve when in an open position. Excessive valve leakage may require the temporary isolation of the portion of the fluid circuit containing the leaking control valve so that the control valve may be serviced. In extreme cases, excess valve leakage may necessitate that the power generating system be taken off line in order to replace the leaking valve. Excessive leakage may also have a significant economic impact in that it may drive up the operating costs of the power generating system.

For example, in a nuclear power plant, damage to a series of control valves as a result of steam cutting along the leakage path may reduce the circumference of the valve seat of the control valves by 30%. The resulting leakage path for each one of the control valves may be about 0.19 in$^2$ for a total leakage area of only about 1.5 in$^2$. With a steam inlet pressure of 1100 psi at a temperature of 560° F., the steam leakage flow rate translates to over 100,000 lb/hr of lost steam. At a steam flow rate of 13,500 lb/hr/Megawatt for nuclear power plants, the loss represented by the leakage is 7.4 Megawatts of lost electrical power output. At a fuel cost of $1.00/MegaBtu, the annualized cost of the steam leakage through the control valve is over $500,000 in lost revenue. As can be seen, such a small leak may have a tremendous impact on the costs of operating the power generating system.

By monitoring the flow rate of fluid through a valve, valve leakage may be detected at an early stage such that the risk of extensive damage to the control valve and to downstream components may be minimized. Furthermore, early detection of valve leakage may help to maintain the efficiency and performance of the power generating system such that the operational costs thereof may be kept to a minimum. Thus, there exists a need for a method of monitoring valves such that valve leakage may be quantified.

The present invention addresses the above-described leakage quantification problem by providing a method for determining valve leakage based upon temperature measurements recorded upstream and downstream of the valve. More specifically, the present invention provides a method for determining the flow rate of valve leakage by correlating the heat loss of the fluid across the valve to the change in enthalpy of the fluid across the valve. The change in enthalpy is then correlated to the flow rate of valve leakage.

BRIEF SUMMARY OF THE INVENTION

The present invention provides a method for determining valve leakage across a valve for single-phase flow and for two-phase flow. In single-phase flow, fluid is in the form of steam or gas at an inlet of the valve and at a temperature that is above ambient temperature. In two-phase flow, the fluid is in liquid form at the inlet of the valve that subsequently flashes to a mixture of liquid and vapor at an outlet of the valve. Flashing is the sudden vaporization of the liquid caused by a pressure drop across the valve wherein the temperature of the mixture drops to its saturation temperature corresponding to its pressure. Under single-phase flow and two-phase flow conditions, the flow rate of valve leakage may be ascertained by measuring the temperature of bare pipe at locations adjacent the inlet and outlet of the valve. For single phase flow, the temperature of the bare pipe is measured at two locations downstream of the valve. For two-phase flow, the temperature of insulated pipe is measured at the inlet and the outlet of the valve.

In single-phase flow across the valve, the underlying principle upon which the leakage flow may be determined is that the heat loss across a length of bare pipe causes a drop in the temperature of the leakage flow. Thus, in measuring the leakage across a valve with single-phase flow, a section of the piping immediately downstream of the valve is provided in a bare or uninsulated state. The surface temperature of the bare pipe is measured immediately adjacent the valve outlet. The surface temperature of the bare pipe is also measured at a downstream end of the bare pipe. The temperature differential across the length of the bare pipe corresponds to a loss in enthalpy across the length. The loss in enthalpy is representative of the heat loss in the length of bare pipe.

The heat loss in the uninsulated portion of the bare pipe is the result of a combination of convective and radiative heat loss. Convective heat loss occurs as a result of the temperature differential between the outer surface of the bare pipe and the relatively cooler ambient air. Radiative heat loss occurs as a result of the electromagnetic radiation of heat from the outer surface of the bare pipe to relatively cooler objects surrounding the bare pipe. The radiative heat loss of the bare pipe is dependent on the thermal emissivity of the bare pipe outer surface. By using input parameters of the ambient air temperature as well as the temperature differential across the length of bare pipe as representative of the heat loss, the flow rate of valve leakage, if any, may be calculated for a bare pipe configuration of a given length, diameter and thermal emissivity.

In two-phase flow across the valve, the underlying principle upon which the leakage flow may be determined is based upon the condition that the liquid at the inlet of the valve (i.e., upstream of the valve) flashes to a mixture of liquid and vapor at the outlet of the valve (i.e., downstream of the valve). Under this condition, the flow downstream of the valve is at saturation temperature for its pressure. The underlying principle for determining valve leakage under such a condition is that any leakage of the valve will cause an increase in the pressure on the downstream side of the valve because of frictional resistance to flow in the downstream piping.

The increased pressure of the flow downstream of the valve corresponds to a higher temperature as compared to the temperature at the same location when there is no leakage. The temperature of insulated pipe upstream and downstream of the valve is representative of the respective temperatures of the flow across the valve. The respective temperatures may be measured at the outer surface of the insulated pipe. By using input parameters of actual and predicted temperature differential for conditions of no leakage at the valve outlet, the flow rate of valve leakage, if any, may be calculated for a given piping configuration.

BRIEF DESCRIPTION OF THE DRAWINGS

These as well as other features of the present invention will become more apparent upon reference to the drawings wherein.

DETAILED DESCRIPTION OF THE INVENTION

Figure 1:
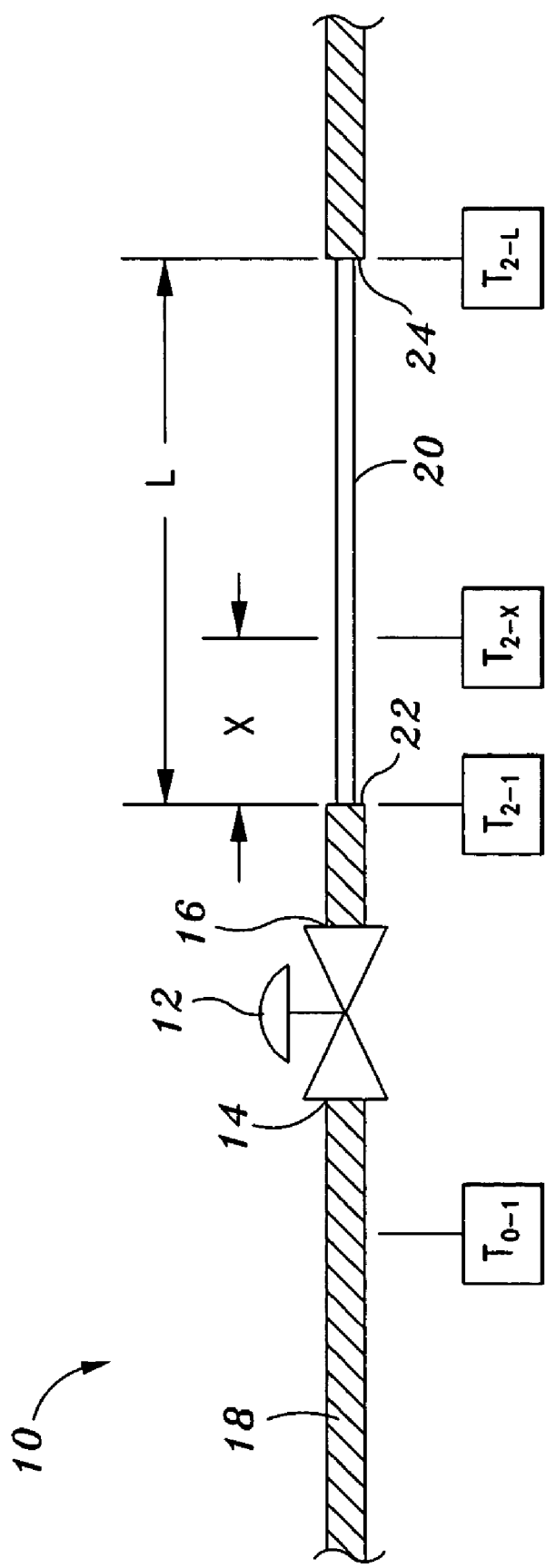
FIG. 1 is a schematic view of a piping system arrangement for determining leakage flow rate of a valve wherein fluid passes through the valve in single-phase flow.

Referring now to the drawings wherein the showings are for purposes of illustrating preferred embodiments of the present invention only, and not for purposes of limiting the same, FIG. 1 illustrates a piping system 10 arrangement having a valve 12 interposed between a first pipe section 18 and a second pipe section 20. As can be seen, the valve 12 has an inlet 14 and an outlet 16. The piping system 10 of FIG. 1 is arranged for detecting leakage of the valve 12 and measuring the leakage flow rate $W_{leak}$ of the valve 12 when the fluid flows through the valve 12 in a single-phase flow of a gas or steam. In single-phase flow, the underlying principle upon which the leakage of the valve 12 may be detected and measured is that the heat loss across a length of bare pipe located downstream of the valve 12 causes a decrease in the temperature of the leakage flow.

Figure 2:
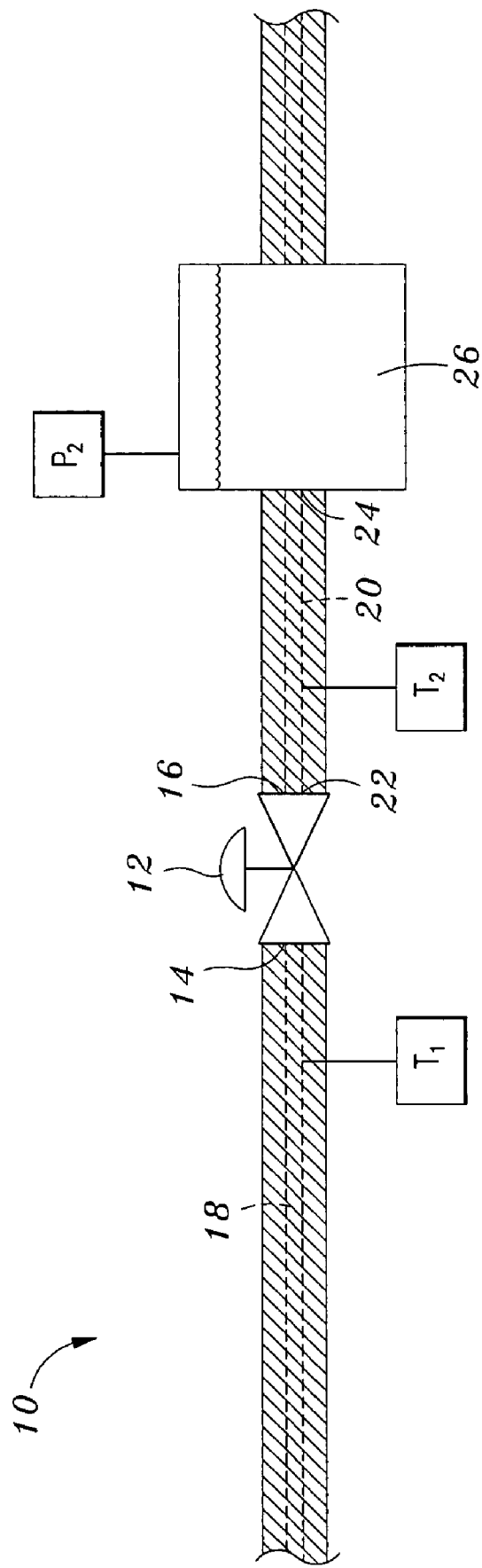
FIG. 2 is a schematic view of a piping system arrangement for determining the leakage flow rate of the valve for conditions wherein fluid transitions from a liquid-phase flow at a valve inlet to a two-phase flow at a valve outlet.

The piping system 10 of FIG. 2 is arranged for measuring the leakage flow rate $W_{leak}$ through the valve 12 when the fluid at the inlet 14 is initially in a liquid-phase that subsequently transitions or flashes into a two-phase flow at the outlet 16. The two-phase flow may be comprised of a mixture of liquid and vapor. In two-phase flow, the underlying principle upon which leakage of the valve 12 may be measured is that the flow downstream of the valve 12 is at its saturation temperature for its pressure such that any leakage of the valve 12 will cause an increase in pressure of the fluid with a corresponding increase in temperature of the piping system 10 on a downstream side of the valve 12 as compared to the temperature of the piping system 10 at the same location when there is no leakage. The increase in temperature is caused by an increase in pressure resulting from frictional resistance to flow in downstream piping.

In FIG. 1, the second pipe section 20 of length L is provided in a bare or uninsulated condition. The first pipe section 18 is fluidly connected to the inlet 14. The second pipe section 20 is fluidly connected to the outlet 16. As can be seen in FIG. 1, the second pipe section 20 has a first end 22 and a second end 24. A temperature $T_{2-1}$ of an outer surface of the second pipe section 20 is measured at the first end 22. A temperature $T_{2-L}$ of the outer surface of the second pipe section 20 is measured at the second end 24. For single-phase flow, the leakage of the closed valve 12 may be detected according to a method of the present invention wherein the temperatures $T_{2-1}$ and $T_{2-L}$ of the first end 22 and the second end 24 of the second pipe section 20 are compared. Substantially equal and relatively high temperatures $T_{2-1}$, $T_{2-L}$ across the length L of the second pipe section 20 are indicative of a high leakage rate in the valve 12. Conversely, unequal or different temperatures $T_{2-1}$, $T_{2-L}$ across the length L of the second pipe section 20 are indicative of an absence of leakage in the valve 12. Using the same method in the first pipe section 18, leakage of the closed valve 12 may also be detected by measuring a temperature differential across a length of the first pipe section 18. Substantially equal and relatively high temperatures across the length of the first pipe section 18 are indicative of a high leakage flow rate in the valve 12 while different temperatures $T_{2-1}$, $T_{2-L}$ across the length L of the first pipe section 18 are indicative of an absence of leakage in the valve 12.

In addition to comparing $T_{2-1}$ and $T_{2-L}$ in order to detect leakage of the closed valve 12, $T_{2-L}$ may also be compared to ambient temperature $T_{amb}$ of the air surrounding the piping system 10. Substantially equal values for $T_{amb}$ and $T_{2-L}$ may also indicate an absence of leakage in the valve 12. For example, in the case where the valve 12 in FIG. 1 is a steam drain valve, a temperature of a surface of the first pipe section 18 may be cooler relative to a temperature of components that are upstream of the first pipe section 18 under conditions of no leakage of the steam drain valve. In practice, it has been observed that such conditions are indicative of an absence of flow in the first pipe section 18 which is further indicative of an absence of leakage through the steam drain valve.

For single-phase flow, the leakage flow rate $W_{leak}$ of the valve 12 may be calculated in a method of the present invention wherein a temperature differential across the length L of the second pipe section 20 is correlated to a loss in enthalpy of the fluid flowing therethrough. The loss in enthalpy is then correlated to the leakage flow rate $W_{leak}$ of the valve 12.

The correlation of loss in enthalpy to the leakage flow rate $W_{leak}$ may be mathematically described wherein $h_{0-1}$ is representative of enthalpy $h_{0-1}$ of the fluid at a fluid source (not shown) of the piping system 10. At the fluid source, the enthalpy $h_{0-1}$ of the fluid corresponds to a temperature $T_{0-1}$ and known pressure $P_{0-1}$ of the fluid. At the second end 24 of the second pipe section 20, the enthalpy $h_{2-L}$ of the fluid corresponds to the temperature $T_{2-L}$ of the surface of the second pipe section 20 at the second end 24. Because throttling of the valve 12 is an is enthalpic process, the loss in enthalpy of the fluid in the second pipe section 20 is equivalent to the heat loss in the second pipe section 20. The loss in enthalpy in the second pipe section 20 may be expressed as:

$$\Delta h = (h_{0-1} - h_{2-L}) \tag{1}$$

The loss in enthalpy or heat loss in the second pipe section 20 is the result of a combination of convective heat loss $Q_c$ and radiative heat loss $Q_r$. Convective heat loss $Q_c$ occurs as a result of the temperature differential between the surface of the second pipe section 20 and the relatively cooler ambient air. Radiative heat loss $Q_r$ occurs as a result of the electromagnetic radiation of heat from the surface of the second pipe section 20 to relatively cooler objects surrounding the second pipe section 20. The radiative heat loss $Q_r$ of the second pipe section 20 is dependent on the thermal emissivity $\epsilon$ of the outer surface thereof. The convective heat loss $Q_c$ may be mathematically expressed as follows:

$$Q_c = h A_{out}(T_{2,avg} - T_{amb}) \tag{2}$$

where h is a heat transfer coefficient, $A_{out}$ is a surface area of the outer surface along length L of the uninsulated second pipe section 20, $T_{2,avg}$ is an average of temperatures $T_{2-L}$ and $T_{2-1}$, and $T_{amb}$ is the ambient temperature of the air surrounding the second pipe section 20. Radiative heat loss $Q_r$ may be mathematically expressed as follows:

$$Q_r = \epsilon \sigma [\int (T_{2-x}^4 - T_{amb}^4) \cdot dA_{out}] \tag{3}$$

where $\epsilon$ and $\sigma$ are thermal emissivity of the bare second pipe section 20 and Stefan-Boltzmann constant, respectively, and $T_{2-x}$ is a temperature of the surface of the second pipe section 20 at a predetermined distance x downstream of the first end 22. $T_{2-x}$ may also be represented as a function of the predetermined distance x in order to improve accuracy while keeping integration simple. Examples of functions suitable for such representation of $T_{2-x}$ are $2^{nd}$ order (or higher) polynomials and exponential decay types of equations such as the following:

$$T_{2-x} = (T_{2-1})(e^{-kx}) \text{ and } T_{2-x} = T_{2-1} + k_1 x + k_2 x^2$$

wherein $T_{2-1}$ is the temperature of the surface of the second pipe section 20, e is the base of the natural logarithms and is approximately equal to 2.71828, x is the distance downstream of the first end 22, and k is a constant that is representative of heat loss $Q_{flow}$ of the fluid in the second pipe section 20 as a result of a combination of convective heat loss $Q_c$ and radiative heat loss $Q_r$.

The heat loss $Q_{flow}$ of the fluid in the second pipe section 20 with leakage flow rate $W_{leak}$ may be mathematically expressed as follows:

$$Q_{flow} = W_{leak}(h_{0-1} - h_{2-L}) \tag{4}$$

where $\Delta h = (h_{0-1} - h_{2-L})$, as recited in Equation (1).

In heat transfer theory, heat loss $\Delta h$ in a system may be generally expressed as follows:

$$\Delta h = C_p(\Delta T) \tag{5}$$

where $C_p$ is an average specific heat of a fluid flowing through the system and $\Delta T$ is a temperature differential of the fluid measured at two locations in the system. In the piping system 10 of FIG. 1, $\Delta T$ is the difference between $T_{2-1}$ and $T_{2-L}$. By substituting Equation (5) for heat loss $\Delta h$ into Equation (4), the heat loss equation can be written as follows:

$$Q_{flow} = W_{leak} C_p (T_{2-1} - T_{2-L}) \tag{6}$$

wherein $Q_{flow}$ is the heat loss of the second pipe section 20. As was mentioned earlier, the heat loss $Q_{flow}$ of the second pipe section 20 is the sum of the convective heat loss $Q_c$ and the radiative heat loss $Q_r$ and may be written as follows:

$$Q_{flow} = Q_c + Q_r \tag{7}$$

Therefore, by combining Equations (2), (3) and (6), the leakage flow rate $W_{leak}$ can be determined by the following expression:

$$W_{leak} C_p(T_{2-1} - T_{2n}) = h_c A_{out}(T_{2,avg} - T_{amb}) + \epsilon \sigma [\int (T_{2x}^4 - T_{amb}^4) \cdot dA_{out}] \tag{8}$$

wherein the heat transfer coefficient $h_c$ may be determined by the following heat transfer equation:

$$Nu_D = h_c D_{out}/k \tag{9}$$

wherein $Nu_D$ is a dimensionless Nusselt Number, k is the thermal conductivity of air, and $D_{out}$ is an outer diameter of the second pipe section 20. In heat transfer theory, the Nusselt Number is a ratio of total heat transfer of a system to conductive heat transfer of the same system. For convective heat loss in horizontally disposed cylinders, $Nu_D$ may be determined from the following correlation:

$$Nu_D = [0.60 + 0.387[Ra_D/\{1+(0.559/Pr)^{9/16}\}^{16/9}]^{1/6}]^2 \tag{10}$$

wherein $Ra_D$ is the Rayleigh Number and Pr is the Prandtl Number for a given configuration of the second pipe section 20. The Prandtl Number Pr is equivalent to $[\nu/\mu]$. The Rayleigh Number $Ra_D$ is equivalent to the following expression:

$$Ra_D = g(\Delta T/T_{amb}) D_{out}^3/[\nu \alpha] \tag{11}$$

wherein g is a gravitational constant, $\Delta T$ is a temperature difference between $T_{2,avg}$ and $T_{amb}$, $D_{out}$ is an outer diameter of the length L of the second pipe section 20, $\nu$ is a kinematic viscosity of air at $T_{amb}$, and $\alpha$ is a thermal diffusivity of air at $T_{amb}$. By solving Equation (3) for radiative heat loss $Q_r$ of the second pipe section 20 and by substituting a resultant of Equation (3) as well as substituting Equations (10) and (11) into Equation (8), $W_{leak}$ may be expressed by the following Equation (12):

$$W_{leak} = \left[.60 + .387 \left[\frac{g\left(\frac{T_{2-1} - T_{2-L}}{2}\right) D_{out}^3}{(T_{amb})\nu\alpha \left[1 + \left[\frac{.559}{\frac{\nu}{\alpha}}\right]^{9/16}\right]^{16/9}}\right]^{\frac{1}{6}}\right]^2 \frac{\kappa}{C_p D_{out}} + \epsilon\sigma[T_{2-x}^4 - T_{amb}^4] D_{out} L\pi \tag{12}$$

wherein $D_{out}$ is the outer diameter of the length L of the uninsulated portion of the second pipe section 20, $\nu$ is the kinematic viscosity of air at $T_{amb}$, $\alpha$ is the thermal diffusivity of air at $T_{amb}$, $C_p$ is the specific heat of air at $T_{amb}$, $\epsilon$ is the thermal emissivity of the surface of the second pipe section 20, $\sigma$ is the Stefan-Boltzmann constant given as $5.67 \times 10^{-8}$ W/m²K⁴, and g is the gravitational constant given as 9.8 m/sec².

Utilizing Equation (12), the leakage flow rate $W_{leak}$ for single-phase flow through the valve 12 may be measured in a method wherein fluid is initially moved through the second pipe section 20. The temperature $T_{2-1}$ is then measured at the surface of the second pipe section 20 at the first end 22. The temperature $T_{2-L}$ at the surface of the second pipe section 20 at the second end 24 is also measured. The temperature $T_{2-x}$ of the surface of the second pipe section 20 at a predetermined distance x downstream of the first end 22 is measured or determined as a function of the predetermined distance x in a manner as was earlier mentioned. In addition, the ambient temperature $T_{amb}$ of air surrounding the second pipe section 20 is also measured. The leakage flow rate $W_{leak}$ is then calculated according to Equation (12).

The temperatures $T_{2-1}$ and $T_{2-L}$ may be respectively measured by a first temperature sensor and a second temperature sensor mounted on the surface of the second pipe section 20 at respective ones of the first and second ends 22, 24. The first and second temperature sensors are operative to generate a first temperature signal and a second temperature signal, respectively. The first and second temperature signals are representative of temperatures $T_{2-1}$ and $T_{2-L}$, respectively. In addition, the temperature $T_{2-x}$ may be measured by a third temperature sensor mounted on the surface of the second pipe section 20 at the predetermined distance x downstream of the first end 22. The third temperature sensor is operative to generate a third temperature signal representative of $T_{2-x}$.

By configuring the piping system 10 of FIG. 1 with first, second and third temperature sensors mounted and configured as described above, a rate of change of the leakage flow rate $\Delta W_{leak}$ may be determined in order to monitor and detect an increase in the leakage of the valve 12. A method of determining the rate of change of the leakage flow rate $\Delta W_{leak}$ comprises the additional steps of generating an ambient temperature signal representative of $T_{amb}$. The first, second, third and ambient temperature signals are then continuously recorded. Utilizing Equation (12), the leakage flow rate $W_{leak}$ is continuously calculated based upon the first, second, third and ambient temperature signals. A time history is then generated by continuously recording the leakage flow rate $W_{leak}$. The rate of change of the leakage flow rate $\Delta W_{leak}$ may then be determined. The rate of change of the leakage flow rate $\Delta W_{leak}$ is representative of the time history of the leakage flow rate $W_{leak}$.

Figure 3:
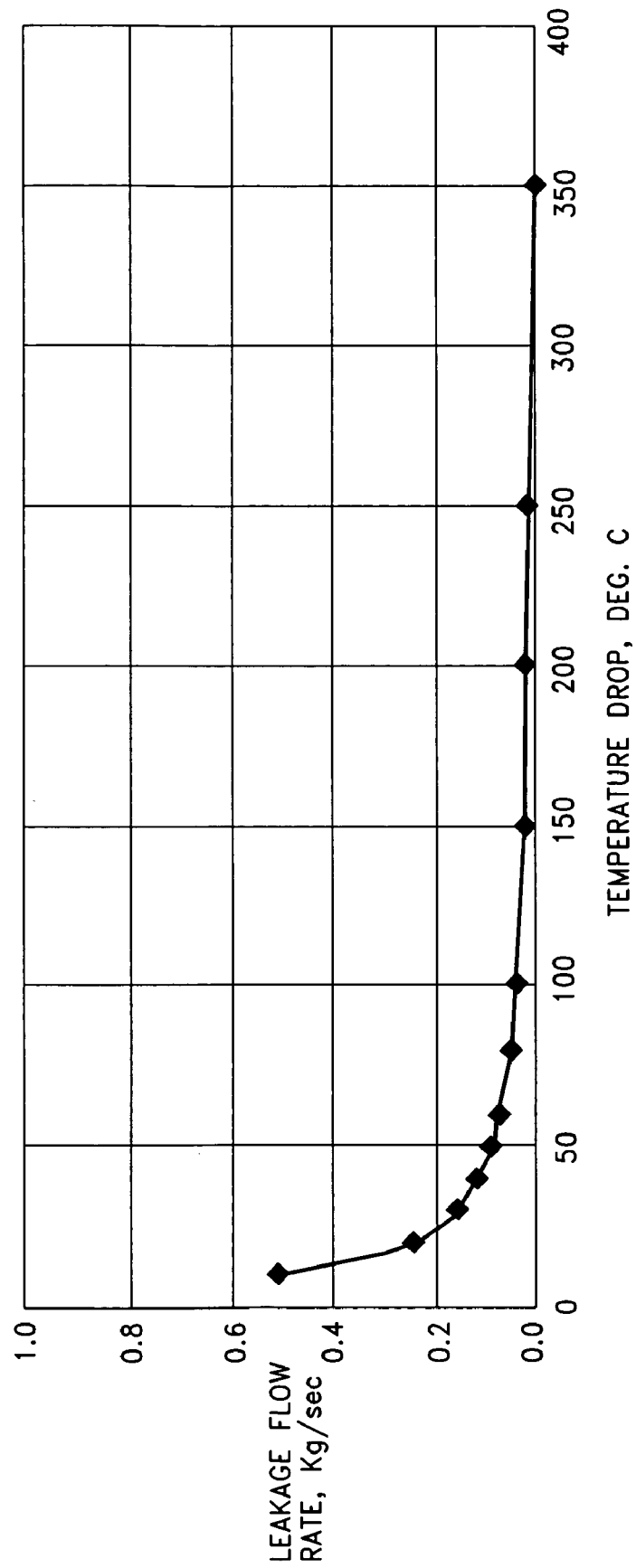
FIG. 3 is a graph of the valve leakage flow rate vs. temperature decay of an uninsulated length of pipe section for conditions wherein the fluid is in single-phase flow.

Turning now to FIG. 3, shown is a graph illustrating an example of estimated leakage flow rate $W_{leak}$ of a drain valve 12. In FIG. 3, leakage flow rate $W_{leak}$ is plotted against temperature decay of the uninsulated length L of the second pipe section 20 for the above-described condition wherein the fluid flows through the valve 12 in a single-phase flow of steam or gas. As can be seen in the graph of FIG. 3, a relatively large temperature drop of about 350° C. across the second pipe section 20 corresponds to a relatively low leakage flow rate $W_{leak}$, indicated on the graph at about 0.0 Kg/sec. Conversely, in the graph of FIG. 3, a relatively small temperature drop of about 10° C. across the second pipe section 20 corresponds to a relatively higher leakage flow rate $W_{leak}$, indicated on the graph at about 0.5 Kg/sec.

Turning now to FIG. 2, shown is the piping system 10 in an arrangement such that the leakage flow rate of the valve 12 may be measured for two-phase flow. In two-phase flow, the fluid is in a liquid-phase at the inlet 14 and subsequently flashes to a mixture of liquid and vapor at the outlet 16. Under such two-phase flow conditions, the fluid downstream of the valve 12 is at its saturation pressure $P_{2s}$ for its temperature. In FIG. 2, the first pipe section 18 is provided in an insulated condition. The second pipe section 20 of length L is also provided in an insulated condition. A vessel 26 is provided downstream of the second pipe section 20. The vessel 26 may be configured as a condenser or a tank. However, any location downstream of the valve 12 where pressure is known may be a suitable location for determining the saturation pressure $P_{2s}$. The first pipe section 18 is fluidly connected to the inlet 14. The second pipe section 20 is fluidly connected between the outlet 16 and the vessel 26.

As was mentioned earlier, the underlying principle upon which the leakage flow rate $W_{leak}$ may be determined for two-phase flow is that any leakage of the valve 12 will cause an increase in the pressure on the downstream side of the valve 12 because of frictional resistance to flow in the downstream piping. The increased pressure of the flow downstream of the valve 12 corresponds to a higher temperature of the surface of the second pipe section 20 as compared to the temperature of the second pipe section 20 when there is no leakage of the valve 12. In this regard, temperatures $T_1$, $T_2$ of respective ones of the first and second pipe sections 18, 20 are representative of the flow and, hence, the leakage across the valve 12.

In a method of detecting leakage of the valve 12 for two-phase flow, the pressure $P_2$ of the fluid is measured or known. Because saturation pressure of a fluid is a function of temperature of the fluid, the saturation pressure $P_{2s}$ at the valve outlet is determined by correlating $P_{2s}$ to $T_2$ using steam properties commonly available in steam tables. The corresponding density $\rho_{2-0}$ of the two-phase flow is determined for $P_{2s}$. Assuming constant enthalpy of the fluid upstream of the vessel 26, the saturation pressure $P_{2s}$ is compared to the pressure $P_2$. If there is a pressure differential $\Delta P$ between $P_{2s}$ and $P_2$, then there is leakage in the valve 12. The pressure differential $\Delta P$ may be expressed as follows:

$$\Delta P = (P_{2s} - P_2) \tag{13}$$

The relationship between $\Delta P$ and leakage of the valve 12 is given by:

$$\Delta P = (K)(1/2)(\rho_{2-0} V_{2-0}^2) \tag{14}$$

where K is the piping resistance factor for a given piping configuration, $V_{2-0}$ is a velocity of the flow through the second pipe section 20, and $\rho_{2-0}$ is the corresponding density of the two-phase flow through the second pipe section 20. For a given piping system 10 configuration, K is representative of the total resistance to the flow. K includes frictional loss factors for individual pipe sections [(f(L/D)] and loss factors ($K_f$) for individual fittings in the line. In general, for pipe sections, the loss factors for friction are a function of the length and corresponding inner diameter of the pipe section. For a given piping system, K may be expressed as follows:

$$K = (\Sigma \cdot K_f) + \Sigma(fL/D) \tag{15}$$

Because $\rho_{2-0}$ and $\Delta P$ are determined from measurements, and because K is determined from the specific piping system 10 configuration, the velocity $V_{2-0}$ of the two-phase flow may be estimated from Equation (14). In FIG. 2, the area of the pipe $A_{in}$ is known from the length L and the inner diameter $D_{in}$ of the second pipe section 20. Therefore, the leakage flow rate $W_{leak}$ may be calculated from a general equation of continuity for fluid flow wherein a flow rate at a point in a pipe section is equivalent to the product of an inner cross-sectional area of the pipe section and the speed with which the fluid is moving through the pipe section. By including the density parameter in the general equation of continuity, the leakage flow rate may be described in terms of unit mass of fluid per unit time. Such a relationship may be mathematically expressed as follow:

$$W_{leak} = \rho_{2-0} A_{in} V_{2-0} \quad (16)$$

Referring still to the piping system 10 arrangement of FIG. 2, a method of measuring the leakage flow rate $W_{leak}$ of the valve 12 is provided by substituting Equations (14) and (15) into Equation (16). The leakage flow rate $W_{leak}$ of the valve 12 for two-phase flow is dependent on the frictional losses in the piping configuration and may be calculated utilizing one of Equations (17), (18) or (19) recited below.

The method of measuring the leakage flow rate $W_{leak}$ of the valve 12 comprises the steps of initially moving fluid from the first pipe section 18 into the inlet 14 of the valve 12. Due to leakage of the valve 12, the fluid exits at the outlet 16. The fluid is moved through the second pipe section 20 and into the vessel 26. The temperature $T_1$ of the surface of the first pipe section 18 is measured. As shown in FIG. 2, the first and second pipe sections 18, 20 are insulated. The temperature measurements are taken on bare pipe surface underneath insulation that covers the first and second pipe sections 18, 20 such as by temperature probes extending through holes in the insulation. The temperature $T_2$ of the surface of the second pipe section 20 is measured. The pressure $P_2$ of fluid at the valve outlet 16 is measured. The saturation pressure $P_{2s}$ of the fluid at the valve outlet 16 is determined by correlation to the temperature $T_2$, as was earlier described. The density $\rho_{2-0}$ of the fluid within the vessel 26 is then determined by correlation to the saturation pressure $P_{2s}$. Frictional losses $K_{p2}$ for the second pipe section 20 are determined and utilized for calculating a leakage flow rate $W_{leak}$ according to the formula $$W_{leak} = \rho_{2-0} \left(\frac{D_{in}}{2}\right)^2 \pi \sqrt{\frac{2(P_{2s} - P_2)}{\rho_{2-0}[K_{p2}]}} \quad (17)$$

wherein $D_{in}$ is the inner diameter of the second pipe section 20.

For piping systems including at least one additional downstream pipe section (not shown) located upstream of the vessel 26, frictional losses $K_{px}$ of the downstream pipe sections are incorporated into Equation (17) for calculating the leakage flow rate $W_{leak}$ according to the following formula:

$$W_{leak} = \rho_{2-0} \left(\frac{D_{in}}{2}\right)^2 \pi \sqrt{\frac{2(P_{2s} - P_2)}{\rho_{2-0}[\sum K_{p2} + K_{px}]}} \quad (18)$$

For piping system 10 configurations including at least one pipe fitting (not shown) located upstream of the vessel 26, the method of calculating the leakage flow rate $W_{leak}$ comprises the additional steps of determining frictional losses $K_f$ for the pipe fitting and calculating the leakage flow rate $W_{leak}$ according to the following formula:

$$W_{leak} = \rho_{2-0} \left(\frac{D_{in}}{2}\right)^2 \pi \sqrt{\frac{2(P_{2s} - P_2)}{\rho_{2-0}[\sum K_{p2} + K_{px} + K_f]}} \quad (19)$$

A first and second temperature sensor may be mounted on respective ones of the first and second pipe sections 20. The first and second temperature sensors are operative to generate first and second temperature sensor signals representative of $T_1$ and $T_2$, respectively. Furthermore, a pressure sensor may be mounted on the vessel 26 for measuring pressure $P_2$ of the vessel 26. The pressure sensor is operative to generate a first pressure signal representative of $P_2$. The piping system 10 shown in FIG. 2 may be configured such that the first and second temperature sensors and the pressure sensor may continuously record the first and second temperature signals and the pressure signal. A time history of the leakage flow rate $W_{leak}$ may be continuously calculated based upon the first and second temperature signals and the pressure signal such that a rate of change of the leakage flow rate $\Delta W_{leak}$ representative of the time history of the leakage flow rate $W_{leak}$ may be determined.

Figure 4:
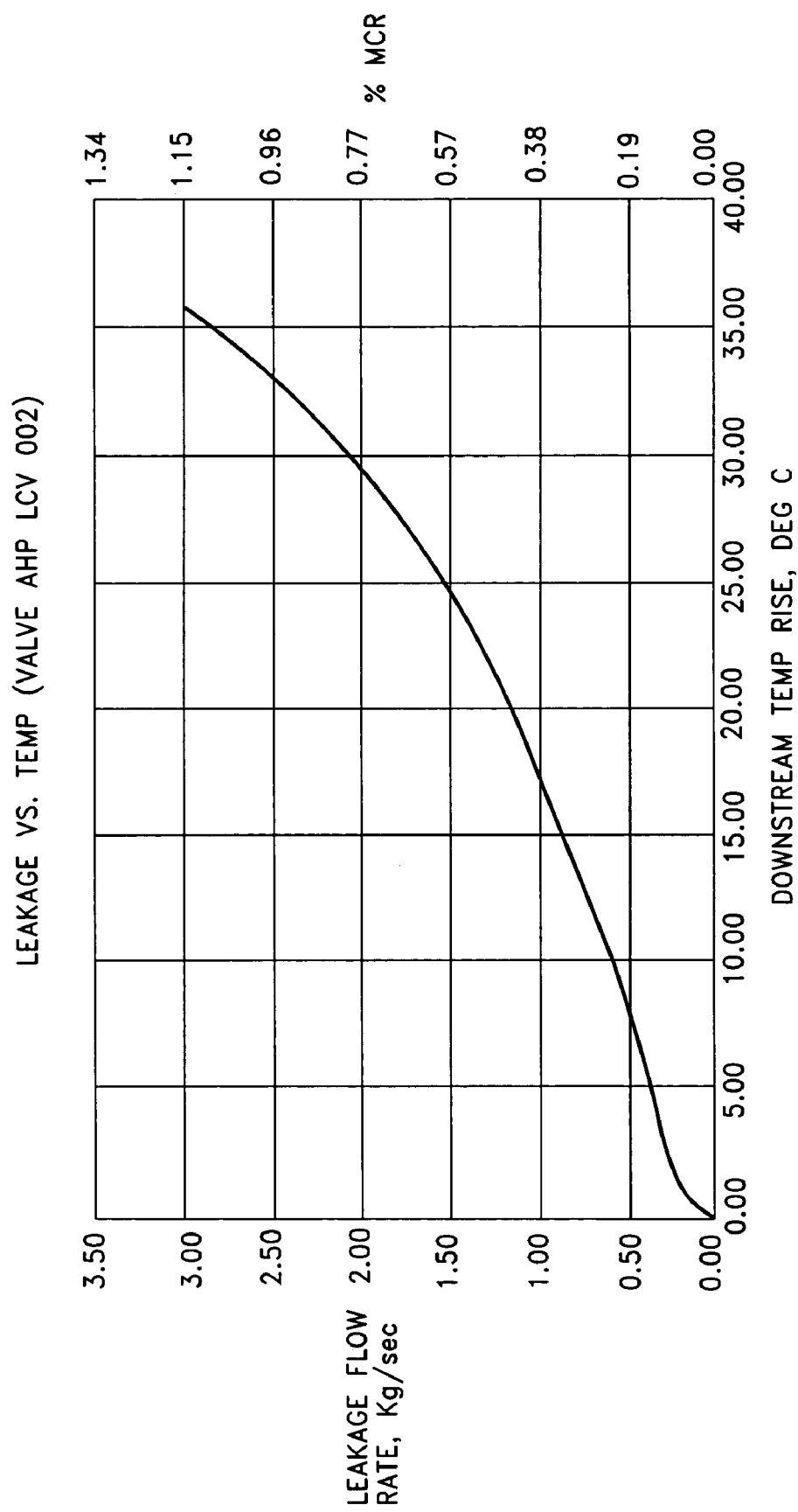
FIG. 4 is a graph of the valve leakage flow rate vs. temperature increase of the uninsulated length of pipe section for a valve wherein fluid transitions from liquid-phase flow to two-phase flow.
Figure 5:
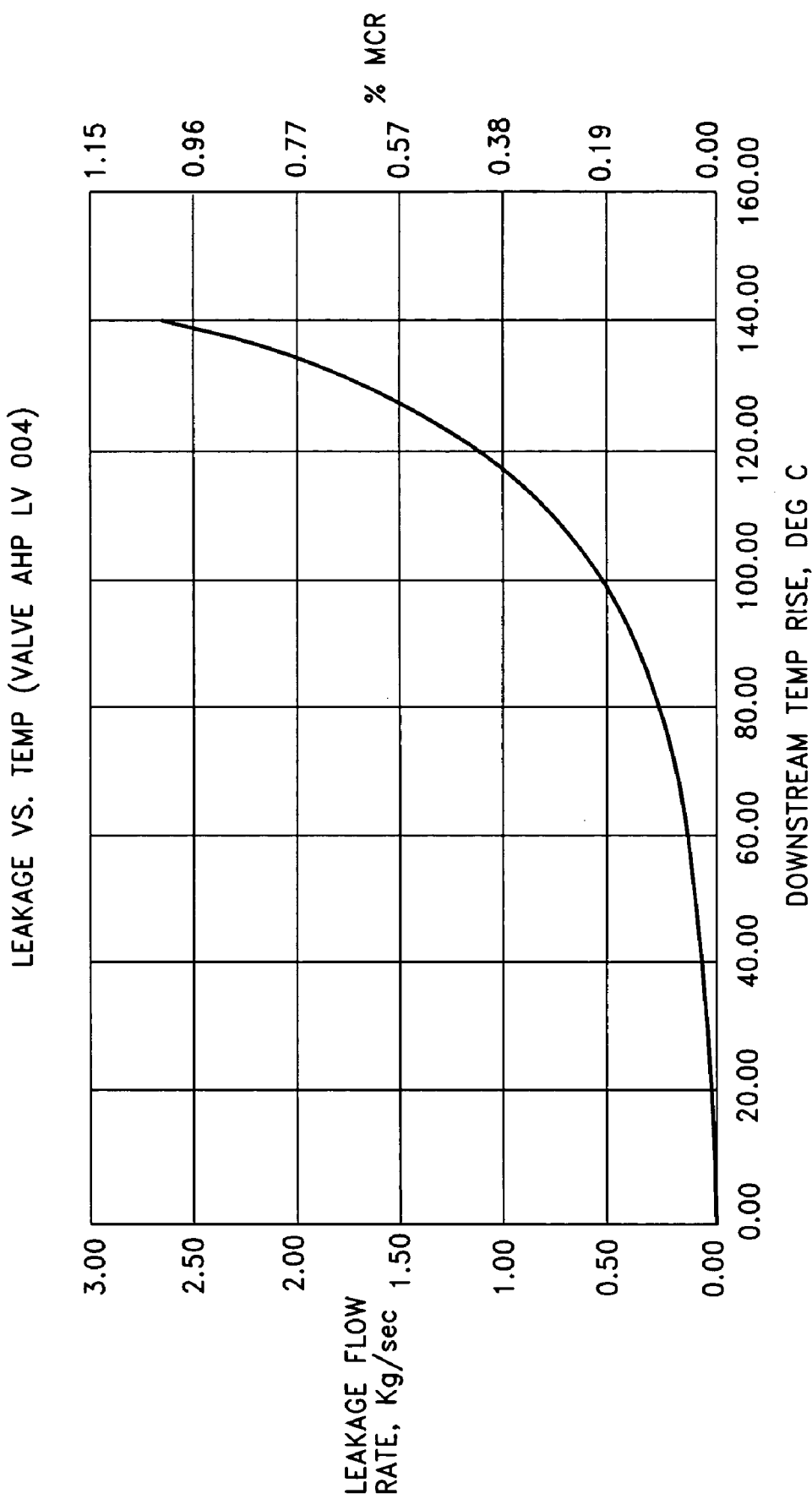
FIG. 5 is a graph of the valve leakage flow rate vs. temperature increase of the uninsulated length of pipe section for a valve of alternate configuration wherein the fluid experiences a relatively larger temperature increase relative to that shown in FIG. 4.

Turning now to FIGS. 4 and 5, shown as examples are graphs of estimated leakage flow rate $W_{leak}$ of two different control valves. In FIGS. 4 and 5, leakage flow rate $W_{leak}$ is plotted against a temperature increase of the second pipe section 20 for the above-described condition wherein the fluid enters the inlet 14 in liquid-phase and then flashes into a mixture of liquid and steam. As can be seen in the graph of FIG. 4, a relatively large temperature increase of about 35° C. of the second pipe section 20 corresponds to a leakage flow rate $W_{leak}$ of about 2.6 Kg/sec. Conversely, in the graph of FIG. 4, a negligible temperature increase of the second pipe section 20 corresponds to a negligible leakage flow rate $W_{leak}$. Likewise, in FIG. 5, a relatively large temperature increase of about 140° C. of the second pipe section 20 corresponds to a leakage flow rate $W_{leak}$ of about 3.0 Kg/sec whereas a relatively smaller temperature increase of about 100° C. of the second pipe section 20 corresponds to a relatively smaller leakage flow rate $W_{leak}$ of about 0.5 Kg/sec.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A method for detecting leakage across a valve having an inlet and an outlet and being fluidly connected to a second pipe section of length (L) having first and second ends, the first end being connected to the outlet, wherein fluid is in single-phase flow at the inlet, the method comprising the steps of:

measuring a temperature ($T_{2-1}$) of a surface of the second pipe section at the first end;

measuring a temperature ($T_{2-L}$) of the surface of the second pipe section at the second end thereof; and comparing $T_{2-L}$ to $T_{2-1}$;

wherein substantially different values for $T_{2-L}$ and $T_{2-1}$ indicates an absence of leakage across the valve.

2. A method for measuring a leakage flow rate of a valve having an inlet and an outlet wherein fluid is in single-phase flow at the inlet and at the outlet, the method comprising the steps of:

moving the fluid through a second pipe section of length (L) having a first end and a second end, the second pipe section being fluidly connected to the outlet at the first end;

measuring a temperature ($T_{2-1}$) of a surface of the second pipe section at the first end;

measuring a temperature ($T_{2-L}$) of the surface of the second pipe section at the second end;

measuring a temperature ($T_{2-x}$) of the surface of the second pipe section at a predetermined distance (x) downstream of the first end;

measuring an ambient temperature ($T_{amb}$) of air surrounding the second pipe section; and calculating the leakage flow rate $W_{leak}$ of the valve according to the formula $$W_{leak} = \left[ \left[ .60 + .387 \left[ \frac{g\left(\frac{(T_{2-1} - T_{2-L})}{2}\right)D_{out}^3}{(T_{amb})\nu\alpha} \left[ 1 + \left[\frac{.559}{\frac{\nu}{\alpha}}\right]^{\frac{9}{16}} \right]^{\frac{16}{9}} \right]^{\frac{1}{6}} \right]^2 \frac{\kappa}{CpD_{out}} + \right.$$

$$\left. \varepsilon\sigma[T_{2-x}^4 - T_{amb}^4]D_{out}L\pi \right]$$

wherein $D_{out}$=outer diameter of the second pipe section, $\nu$=kinematic viscosity of air at $T_{amb}$, $\alpha$=thermal conductivity of air at $T_{amb}$, $C_p$=specific heat of air at $T_{amb}$, $\epsilon$=emissivity of the surface of the first pipe section, $\sigma$=Stefan-Boltzmann constant, and g=gravitational constant.

3. The method of claim 2 wherein a first and second temperature sensor are mounted on the second pipe section at the first and second ends, respectively, and are operative to generate a first and second temperature signal representative of $T_{2-1}$ and $T_{2-L}$, respectively.

4. The method of claim 3 wherein $T_{2-x}$ is represented as a function of the predetermined distance (x) downstream of the first end according to the equation $$T_{2-x} = (T_{2-1})(e^{-kx})$$

wherein e is approximately equal to 2.71828, k is a constant that is representative of heat loss in the second pipe section as a result of a combination of convective and radiative heat loss therein.

5. The method of claim 3 wherein a third temperature sensor is mounted on the second pipe section at the predetermined distance x downstream of the first end and being operative to generate a third temperature signal representative of $T_{2-x}$.

6. The method of claim 5 comprising the additional steps of:

generating an ambient temperature signal representative of $T_{amb}$;

continuously recording the first, second, third and ambient temperature signals;

continuously calculating $W_{leak}$ based upon the first, second, third and ambient temperature signals;

generating a time history of the leakage flow rate by continuously recording $W_{leak}$; and determining a rate of change of the leakage flow rate ($\Delta W_{leak}$) representative of the time history of $W_{leak}$.

7. A method for detecting leakage of a valve in a piping system, the valve having an inlet and an outlet wherein fluid passing through the valve transitions from liquid-phase flow at the inlet to two-phase flow at the outlet, the method comprising the steps of:

providing a second pipe section fluidly connected to the outlet;

measuring a temperature ($T_2$) of a surface of the second pipe section;

determining a corresponding saturation pressure ($P_{2s}$) of the fluid flowing through the second pipe section by correlation to temperature $T_2$;

measuring a pressure ($P_2$) of the fluid at a location that is substantially downstream of the second pipe section; and comparing $P_{2s}$ to $P_2$;

wherein substantially equal values for $P_{2s}$ and $P_2$ indicates an absence of leakage across the valve.

8. A method for measuring the leakage flow rate of a valve in a piping system, the valve having an inlet and an outlet wherein fluid passing through the valve transitions from liquid-phase flow at the inlet to two-phase flow at the outlet, the method comprising the steps of:

providing a vessel downstream of the outlet;

providing a first and a second pipe section, the first pipe section being fluidly connected to the inlet, the second pipe section fluidly connecting the outlet to the vessel;

moving the fluid from the first pipe section, through the valve, through the second pipe section and into the vessel;

measuring a temperature ($T_1$) of a surface of the first pipe section;

measuring a temperature ($T_2$) of a surface of the second pipe section;

measuring a pressure ($P_2$) of the fluid within the vessel;

determining a saturation pressure ($P_{2s}$) of the fluid within the vessel by correlation to temperature $T_2$;

determining a density ($\rho_{2-0}$) of the fluid within the vessel by correlation to the saturation pressure $P_{2s}$;

determining frictional losses ($K_{p2}$) for the second pipe section; and calculating a leakage flow rate $W_{leak}$ according to the formula $$W_{leak} = \rho_{2-0}\left(\frac{D_{in}}{2}\right)^2 \pi \sqrt{\frac{2(P_{2s} - P_2)}{\rho_{2-0}[K_{p2}]}}$$

wherein $D_{in}$=inner diameter of the pipe.

9. The method of claim 8 wherein the piping system includes at least one downstream pipe section located upstream of the vessel, the method comprising the additional steps of:

determining the frictional loss $K_{px}$ for the downstream pipe section; and calculating the leakage flow rate $W_{leak}$ according to the formula $$W_{leak} = \rho_{2-0}\left(\frac{D_{in}}{2}\right)^2 \pi \sqrt{\frac{2(P_{2s} - P_2)}{\rho_{2-0}[\sum K_{p2} + K_{px}]}}.$$

10. The method of claim 9 wherein the piping system includes at least one pipe fitting located upstream of the vessel, the method comprising the additional steps of:
   determining frictional losses ($K_f$) for the pipe fitting; and
   calculating the leakage flow rate $W_{leak}$ according to the formula $$W_{leak} = \rho_{2-0}\left(\frac{D_{in}}{2}\right)^2 \pi \sqrt{\frac{2(P_{2s} - P_2)}{\rho_{2-0}[\Sigma K_{p2} + K_{px} + K_f]}}.$$

11. The method of claim 8 wherein a first and second temperature sensor are mounted on respective ones of the first and second pipe sections and are operative to generate a first and second temperature sensor signal representative of $T_1$ and $T_2$, respectively.

12. The method of claim 11 wherein a pressure sensor is mounted on the vessel and is operative to generate a first pressure signal representative $P_2$.

13. The method of claim 12 comprising the additional steps of:
   continuously recording the first and second temperature signals and the pressure signal;
   generating a time history of the leakage flow rate by continuously calculating $W_{leak}$ based upon the first and second temperature signals and the pressure signal; and
   determining a rate of change of the leakage flow rate ($\Delta W_{leak}$) representative of the time history of the leakage flow rate $W_{leak}$.

* * * * *